United States Patent [19]

Le Du

[11] 4,261,292
[45] Apr. 14, 1981

[54] MILKING INSTALLATION FOR ANIMALS
[75] Inventor: Jean Le Du, Le Rheu, France
[73] Assignee: Etablissement Public dit "Institut National de la Recherche Agronomique"
[21] Appl. No.: 30,147
[22] Filed: Apr. 16, 1979
[30] Foreign Application Priority Data Apr. 21, 1978 [FR] France .................. 78 12863

[51] Int. Cl.³ .............................................. A01K 1/12
[52] U.S. Cl. .............................................. 119/14.04
[58] Field of Search .................... 119/14.03, 14.04, 28

[56] References Cited

U.S. PATENT DOCUMENTS

| | | | |
|---|---|---|---|
| 1,987,955 | 1/1935 | Hapgood | 119/14.04 |
| 3,402,699 | 9/1968 | Cain | 119/14.04 |
| 3,810,442 | 5/1974 | Jacobs et al. | 119/28 X |
| 3,877,419 | 4/1975 | Rodger | 119/14.03 |
| 3,885,528 | 5/1975 | Vandenberg | 119/14.03 |

FOREIGN PATENT DOCUMENTS 313691  8/1969  Sweden .................. 119/14.04

*Primary Examiner*—Hugh R. Chamblee
*Attorney, Agent, or Firm*—Laff, Whitesel & Rockman

[57] ABSTRACT

According to a characteristic feature of the present invention, the conveyor moves in an alternating fashion, and the milking operation takes place over two outward and two inward journeys. During the first outward journey, the sheep join the conveyor and receive their teat cups as they pass in front of an operator; during the first inward journey, the milking continues; during the second outward journey, the teat cups are removed as the sheep pass in front of the operator and are freed from the retaining apparatus to leave the parlor; and during the second inward journey, the conveyor returns empty to the initial position.

5 Claims, 17 Drawing Figures

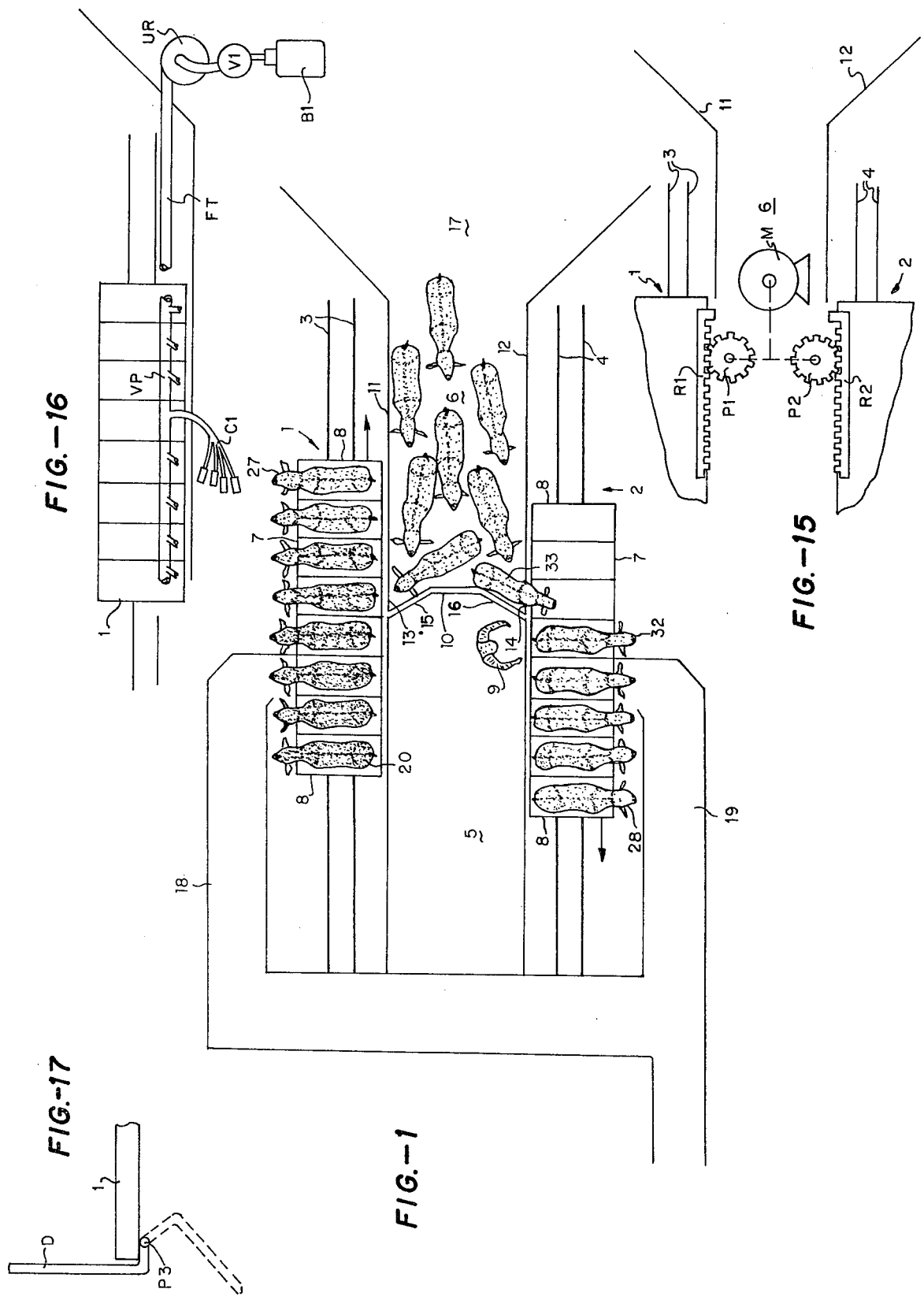

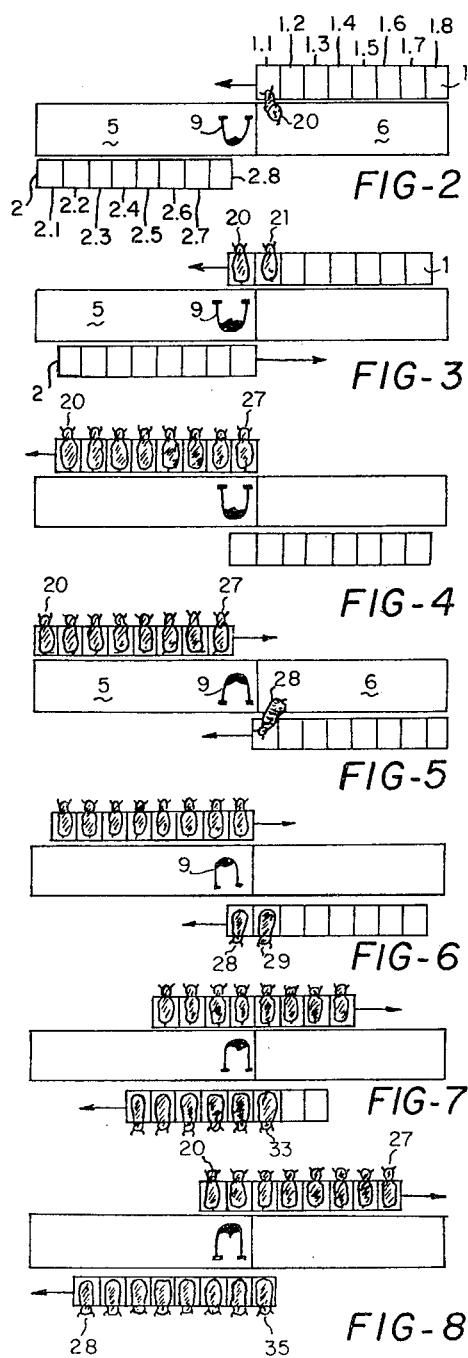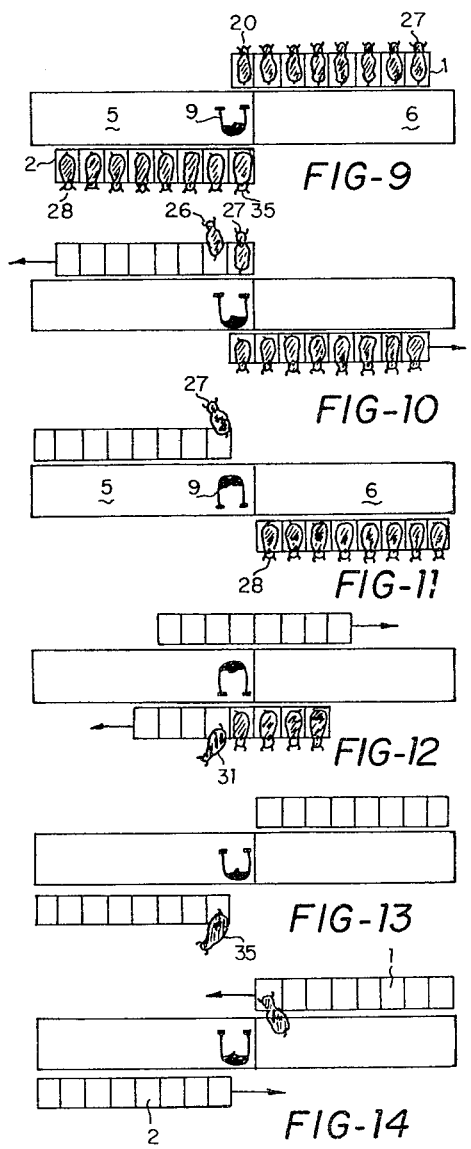

MILKING INSTALLATION FOR ANIMALS

The present invention relates to a milking installation for animals, which is particularly, although not exclusively suitable for sheep, goats and cows.

The specification of French Pat. No. 1,310,015 describes an installation for mechanically milking sheep, the general features of which will now be described. The operators work in a pit above which passes a conduit through which the milk is drawn. On each side of the pit, there is provided a mobile array of stalls, with each stall positioned at right angles to the longitudinal axis of the pit. Each stall has a retaining device including an opening through which a sheep can put its head to reach a manger which is on the side of the array remote from the pit so that the hind legs of the sheep are adjacent to one side of the pit and its teats are easily accessible from the pit. In order to allow the sheep to enter the stalls, the array is first moved away from the side of the pit and when the sheep have all settled in their stalls, the array is moved towards the pit so that the sheep are caused to back up to the pit to enable the operators in the pit to fit the teat cups on the teats.

The operation of this type of installation is discontinuous. About 20% of the total milking time is spent in making the animal go in and out of the array of stalls, or bail as it is otherwise known. The operator has to move from one end of the pit to the other in order to put the teat cups on and take them off. As a result, in this type of installation it is necessary to have two operators. Moreover in order to reduce the time during which the milking assemblies are not being used only one milking assembly is provided for every two stalls, and, in fact, more than half the sheep occupying the stalls at any one time are not being milked.

As far as the milking of cows is concerned, milking installations have been developed in the shape of rotating platforms, thereby allowing the number of operators to be reduced to one who, in practice, works at a fixed station, since the point where the teat cups are put on is fixed, and very near to the point at which the teat cups are taken off, which is also fixed. However, rotating platforms need altering to be used for milking sheep as described, for instance, in the specification of French Pat. No. 2,182,723, to make it possible for several sheep to enter the platform head first. On the other hand, if it is, in fact, true that platform installations of this type are easily automated and allow for work to carry on nonstop, they are complicated from the technical point of view, requiring skilful maintenance and having a price which is too high for the majority of breeders, especially those breeders who have only small or medium sized flocks or herds.

Efforts have also been made to develop longitudinally moving linear conveyors. As a result of this, experiments have been carried out in Bulgaria with an installation in which the retaining assembly or milking bail is mounted on a flexible belt which is operated by means of two feed rollers placed at its ends. Eight milking assemblies are fixed in the centre to an unreeling device which adjusts the length of flexible pipe according to the distance of the stall or parlour from the centre of the installation. In practice, in Bulgaria installations of this kind have been conceived in a mobile form.

This installation, having a longitudinally moving linear conveyor, has, in the form in which it has been constructed, several drawbacks which make it not so interesting. For instance, although the installation has only eight stalls, two operators are required to operate it which prevents a satisfactory level of productivity from being achieved. The milking routine is complex, because after an operator has uncoupled a milking assembly at one end of the band he has to send it back by rail to the operator located at the beginning of the belt. The flexible conveyor belt, made of wooden slats, and the unreeling device for the flexible pipes are expensive elements which may also not be very reliable.

However, conveying the retaining assembly or bail and the milking equipment offers the following advantages. As happens with rotating platforms, the operator does not have to move about. During the conveying operation, a platform may be arranged to come into contact with a number of cam-shafts which control the opening and closing of access gates, the locking and unlocking of the retaining apparatus for the animals, the distribution of the fodder in the mangers and also possibly the unhooking or the taking down of the milking assembly. Such a platform can be conceived in a simpler way than the rotating platform.

A feature of a preferred embodiment of the present invention is the provision of an installation having a longitudinally moving conveyor offering the advantages mentioned above with neither the drawbacks of known installations of this type, nor the drawbacks of transversally moving installations, and offering the advantages of rotating platform installations without their technical drawbacks.

According to a characteristic feature of the present invention the conveyor moves in an alternating fashion, and the milking operation takes place over two outward and two inward journeys. During the first outward journey, the sheep join the conveyor and receive their teat cups as they pass in front of an operator. During the first inward journey the milking continues. During the second outward journey the teat cups are removed as the sheep pass in front of the operator and they are freed from the retaining apparatus to leave the parlor. During the second inward journey, the conveyor returns empty to the initial position.

The already mentioned and other characteristics of the present invention will become clearer when reading the following description of an embodiment thereof given by way of example and with reference to the accompanying drawings in which:

FIG. 1 is a diagrammatic plan view of an installation;

FIGS. 2–14 are diagrammatic representations, in plan, illustrating a series of operational steps of the installation shown in FIG. 1;

FIG. 15 is taken from FIG. 1 and shows a vacuum milking and delivery system;

FIG. 16 is taken from FIG. 1 and shows a vacuum milking and delivery system; and FIG. 17 is taken from FIG. 1 and shows a side elevation of an animal restraining means.

The milking installation shown in FIG. 1 comprises two platforms 1 and 2 mounted on wheels so that they can move along respective pairs of rails 3 and 4 which are parallel and on opposite sides of a pit 5 next to an access area 6.

Each platform 1 and 2 has eight stalls, indicated at 1.1 to 1.8 and 2.1 to 2.8 respectively, each stall being terminated by a retaining device mounted along the outer edge 7 of the platform. As shown in FIG. 1, a sheep being milked has, as a rule, its head held by a retaining device and it occupies all of the space in a stall with its head facing outwards. The sheep may be eating a food concentrate which has been placed in a container (not shown) in front of the retaining device in a well-known manner.

Each stall may be separated from the next one by a light partition, but this is not strictly necessary and may not be desirable with those sheep that prefer to be in contact with their neighbours. Of course, the ends 8 of the platforms 1 and 2 are closed by barriers to prevent the animals placed in the end stalls from falling off the platforms.

The pit 5 has a generally rectangular shape and its floor is at such a level that an operator 9 can easily place a milking assembly or cluster on the teats of the sheep that are on the platforms 1 and 2. The pit 5 is separated from the access area 6 by guide barriers 10. The access area 6 is at the same level as the platforms 1 and 2. Its sides are defined by barriers 11 and 12, except near to the barrier 10 where there are gates 13 and 14. Near to the gates 13 and 14, the barrier 10 has two obliquely angled sections 15 and 16 which act as guides for the sheep as they pass from the access area 6 to the platforms 1 or 2 when the gate 13 or the gate 14 is open. The access area 6 may be extended by an access ramp area 17 in which the sheep are channelled towards the area 6.

Exit corridors 18 and 19 are provided on the respective sides of the platforms 1 and 2 remote from the pit 5 to allow the evacuation of the sheep once the milking is finished. The floors of the corridors 18 and 19 are at the same level, at least at the start, as platforms 1 and 2.

Each platform 1 and 2 has, on the side next to the pit 5, a pipeline (as at VP, FIG. 16) under vacuum and a horizontally extending milk conduit all along the length of the platform at such a height that the sheep can either pass over or under it and yet it is within reach of the operator. Branching off from this conduit there are connected the eight milking assemblies or clusters (as at C1 FIG. 16) corresponding to the eight stalls, whereby the eight sheep are milked. When the clusters of teat cups are not in use they are hooked on to the pipes by means of hooks or other suitable means. The pipes and the milking conduits are connected to a container positioned upon the respective platform. The container B1 (FIG. 16) is connected to a flexible tube FT (FIG. 16) in which a suitable vacuum is created at V1 in a conventional way to ensure the drawing of the milk into the container B1. As these are mobile platforms, the piping under vacuum is maintained extended in the upper part of the installation by means of conventional unreeling devices UR which for instance may consist of large diameter pulleys co-operating with counterweights or springs.

The sequential operation of the installation shown in FIG. 1 will now be described with reference to FIGS. 2-14. Let us suppose that, in the beginning, platform 1 is on the right as shown on the drawing, while platform 2 is on the left. Under these circumstances the stall 1.1 is facing gate 13 which opens so as to allow a first sheep 20 who is waiting in the access area 6 to enter platform 1 and engage its head in the retaining device corresponding to stall 1.1. A minute later, as shown in FIG. 3, platform 1 moves to the left by a distance which is equal to the width of a stall. It is now the turn of stall 1.2 to be facing gate 13 with the result that a second sheep 21 can now take its place immediately next to the sheep 20. The stall 1.1 is now facing pit 5, and this makes it possible for the operator 9 to position the teat cups of the first cluster on the teats of the sheep 20. Moreover as gate 14 is closed, although platform 2 has moved to the right as a result of the movement which is symmetrical with that of platform 1, no sheep may enter stall 2.8.

During the following seven stages, the same operations are repeated. A sheep enters a stall on platform 1 while the operator positions the teat cups on a sheep in the preceding stall. The installation is then in the stage shown in FIG. 4 and the operator has positioned the teat cups of the eighth cluster on the eighth sheep 27. The platform 1 has moved almost all the way over to the left, while the platform 2 has moved over to the right. Gate 13 is closed while gate 14 is opened. A minute later, as shown in FIG. 5, the platform 1 starts moving back towards the right, whereas the platform 2 starts moving back towards the left. As the gate 14 (FIG. 1) is opened, a sheep 28 may join platform 2 and occupy stall 2.1.

Subsequently, as shown in FIG. 6, a sheep 29 occupies the stall 2.2, while the operator 9 positions the teat cups on the sheep 28. FIGS. 7 and 8 show the last sheep 34 and 35 joining the others on the platform 2.

Throughout the return movement of the platform 1 to the right, the sheep 20 to 27 continue to be milked and are kept in position by the retaining devices on platform 1.

FIG. 9 shows what happens when the platform 1 first starts to move again to the left. The operator 9 is now again facing platform 1 and, when the stall 1.1 passes in front of the pit 5, he removes the teat cups from the sheep 20. The platform 2 then starts its first return movement to the right.

A minute later the retaining device of the stall 1.1 is unlocked and as the stall 1.1 faces the corridor 18, as shown in FIG. 1, the sheep 20 can leave via the corridor 18. At the same time, the operator removes the teat cups from the sheep 21.

FIG. 11 shows the installation at a stage when the platform reaches the farthest point to the left and the sheep 27 leaves via the corridor 18, while the platform 2 is again going to move toward the left. The operator then removes the teat cups from the sheep 28.

FIG. 12 shows the installation a few minutes later when the sheep 31 leaves via the corridor 19. FIG. 13 shows the installation at the moment when the sheep 35 leaves via the corridor 19. The operator is already facing the platform 1. Finally, FIG. 14 shows the installation when the milking of a second group of sheep is about to start, in the initial position previously shown in FIG. 2.

It follows from the above that, for each milking cycle, a platform goes backwards and forwards twice. During the first journey, with platform/moving towards the left, the retaining devices are locked subsequently to the sheep entering the stalls. During the first return of platform 1 to the right, these retaining devices remain locked. During the second outward journey towards the left, the retaining devices are unlocked when passing opposite either the exit 18 or 19. During the second return journey these devices remain unlocked.

The retaining devices D (FIG. 17) preferably comprise mechanical systems whereby the locking takes place when the head of the sheep move towards a manger. These mechanical means are unlocked by the action of a cam and drop down under the platform (as shown by dashed lines in FIG. 17). Instead of dropping down, the retaining devices can be pivoted (as at P3) open as in some known systems.

As a result of this, once the locking device has moved out of the way the sheep can leave straight away by advancing.

The movements of the platforms are symmetrical and they can be both driven by a single motor, for instance an electrical motor M (FIG. 15) whose axis will be located under the access area 6, such motor turning two pinions P1, P2 which are geared to racks R1, R2 suitably mounted on the platforms 1 and 2, respectively.

By way of example, each platform 1 or 2 comprising eight stalls, is 3.2 m long, thus requiring rails 3 and 4 to be 6.8 m long. The width of the installation including the exit corridors may be in the order of 5 m.

If one reasonably assumes that from 6 to 8 seconds are required to put on or remove the teat cups, with stalls of 0.40 m, we obtain displacement speeds for the platforms varying from 240 m per hour to 180 m per hour. Productivity measured in sheep per man and per hour varies from 300 to 225 according to theoretical calculations, but in practice these figures come down to 267 and 200.

In another embodiment of the installation, the corridors 18 and 19 may be omitted. In this case, when the head of a sheep is freed from the retaining device, the animal leaves the platform through a barrier 8 which has become a gate and is open. Then the sheep moves along an adjacent platform, using a ramp which extends it and is parallel to the axis of the ditch. In this case, the width of the installations may be reduced to 3 m.

It should be noted that, instead of one motor driving the two platforms, it is obviously possible to use one electric motor per platform.

In another embodiment, only one platform is provided which operates in an alternating rectilinear motion. In this case, it is possible to reduce the time of non-operation of the installation by making the return journey faster than the outward journey, since, during the return journey, either the sheep are restrained by the retaining devices or the platforms are empty.

During the second outward journey, at the end of milking, conventional means may be used for automatically removing the teat cups.

In another embodiment of the installations having only one platform, provision has been made, during each milking cycle, for the platform to make an outward journey with the animals coming in and having the teat cups fixed, followed by a return journey during which milking is carried out and an outward journey when milking is finished and the animals are freed and a return journey during which other animals join the platform and have the teat cups fitted, followed by an outward journey for carrying on the milking and a return journey to finish the milking and free the animals. In this embodiment, a return journey in which the platform is an empty condition, as in the previously described embodiments, is avoided.

The installation is symmetrical. The animals reach the platform which is sensibly located in the centre of the installation, the operator is first on one side when the cycle comprises the stages outward journey, return journey, outward journey, and then on the other side when the cycle comprises the stages return journey, outward journey, return journey. It is to be understood that the two types of cycles are alternating. This installation does not pose any problem as far as the operation of the milk conveying conduit is concerned as this is carried by the platform, as mentioned above. As for the locking and unlocking of the retaining devices, provision will obviously have to be made for them to operate in a time sequence according to the type of cycle in progress.

In the preceding specification, we have looked at a specific case of sheep as animals to be milked, but it must be made clear that the installation is equally suitable for milking goats and for milking cows, or other animals, if made in a suitable size.

I claim:

1. A milking system comprising a milker's elongated pit means extending longitudinally through a first portion of said milking system, a pair of rail means extend along opposite of said elongated pit means and adjacent a second portion of said milking system, said second portion being contiguous to and projecting beyond said first portion, movable platform means mounted on each of said rail means for moving back and forth between said first and second portions of said milking system, a plurality of stalls on each of said platforms, animal restraint means associated with one end of each of said stalls and positioned on a side of said platform means which is opposite said pit, drive means alternately coupled to said platform means for alternatively and continuously moving them back and forth along said rail means between said first and second portions of said system, exit passage means abutting each of said platform means adjacent said animal restraining means, entrance passage means abutting each of said platform means in said second portion of said system, said entrance passage means being adjacent an end of said stalls which is opposite said animal restraining means, and barrier means leading to said entrance passage for guiding and directing animals in said second portion of said milking system.

2. The milking system of claim 1 wherein said drive means comprises a single motor, a rack means individually associated with each of said platforms and pinion means geared to each of said rack means, said motor turning each of said pinion means.

3. The milking system of claim 1 or claim 2 and vacuum pipe means extending from each of said platform means via a flexible tube to a container, a cluster of milking cup means associated with each of said stalls and connected to said vacuum pipe means.

4. The milking system of claim 1 or 2 wherein said animal restraining means drops to a position under the platform when an animal is released from said stall.

5. The milking system of claim 1 or 2 wherein said animal restraining means drops out of an animal's sight when it is released from the stall.

* * * * *

UNITED STATES PATENT AND TRADEMARK OFFICE
CERTIFICATE OF CORRECTION

PATENT NO. : 4,261,292

DATED : 4/14/81

INVENTOR(S) : JEAN LE DU

It is certified that error appears in the above—identified patent and that said Letters Patent is hereby corrected as shown below:

Col. 4, Line 52, after platform "/" s/b --1--

Signed and Sealed this

Fifteenth Day of September 1981

[SEAL]

Attest:

Attesting Officer

GERALD J. MOSSINGHOFF

Commissioner of Patents and Trademarks